May 5, 1970    P. L. CHAPPELL    3,509,779
MAGNETIC TRANSDUCER FOR GYRO ASSEMBLY
Filed June 6, 1966    4 Sheets-Sheet 1

INVENTOR
PETER LEE CHAPPELL
BY
ATTORNEY

May 5, 1970     P. L. CHAPPELL     3,509,779
MAGNETIC TRANSDUCER FOR GYRO ASSEMBLY
Filed June 6, 1966     4 Sheets-Sheet 2

INVENTOR
PETER LEE CHAPPELL
BY
ATTORNEY

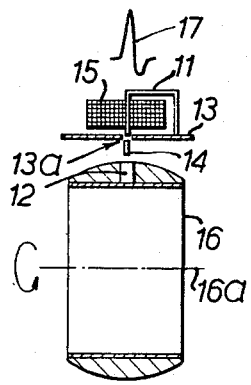
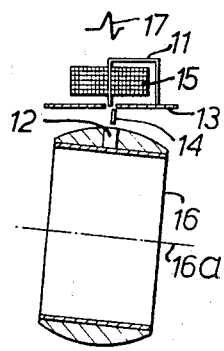
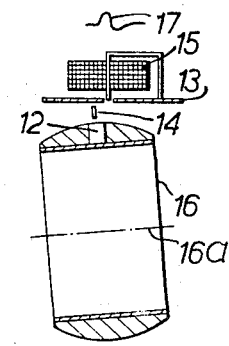
FIG. 7a.    FIG. 7b.    FIG. 7c.
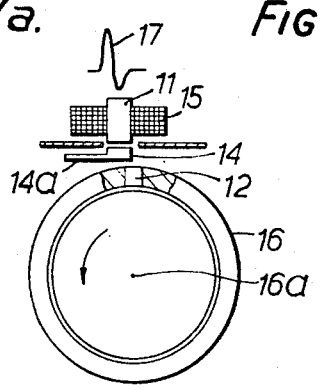
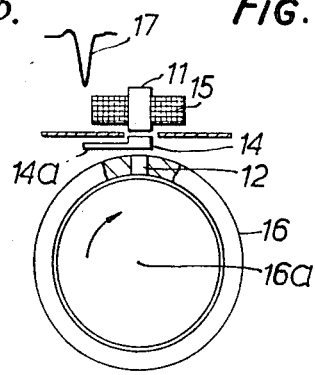
FIG. 8a.    FIG. 8b.
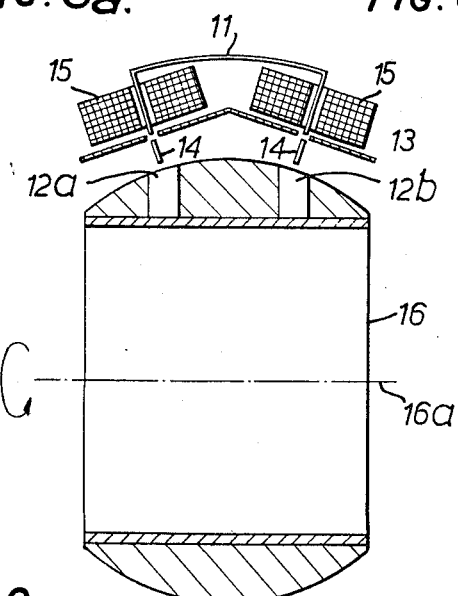
FIG. 9.

United States Patent Office 3,509,779
Patented May 5, 1970

3,509,779
MAGNETIC TRANSDUCER FOR GYRO ASSEMBLY
Peter Lee Chappell, Glenolden, Pa., assignor to Elliott Brothers (London) Limited, London, England, a British company
Filed June 6, 1966, Ser. No. 555,634
Claims priority, application Great Britain, June 9, 1965, 24,322/65
Int. Cl. G01c *19/28*
U.S. Cl. 74—5.6
6 Claims

ABSTRACT OF THE DISCLOSURE

A magnetic transducer, particularly for use in a gyroscope assembly, comprises a fixed sheet of magnetic material having an aperture therein, a longitudinal magnetic member surrounded by a coil and fixed on one side of the sheet so as to extend towards the aperture therein, and a movable longitudinal member mounted on the other side of the sheet so as to be movable between a first position in which it is aligned with the aperture whereby a flux path is created between the two longitudinal members and a signal is produced in the coil and a second position in which it is not aligned with the aperture so that the flux path exists between the movable member and the fixed sheet.

---

The invention relates to magnetic pick-offs.

According to one aspect of the invention there is provided a transducer comprising first, second, and third elements of magnetic material, the first and third elements being mounted adjacent to one another in fixed relationship and they and the said second element being arranged for relative movement between a first position providing a first part for magnetic flux between the first and the second elements and a second position providing a second path for magnetic flux between the second and the third elements, whereby substantially all the said magnetic flux passes along the first path when the elements are in the first position and substantially all the said magnetic flux passes along the said second path when the elements are in the said second position, and output means responsive to the change of flux in at least one said path for indicating said relative movement of the elements.

According to another aspect of the invention there is provided a transducer, comprising a sheet-like member of magnetic material having two spaced apertures therethrough, a U-shaped member of magnetic material fixed to said sheet-like member on one side thereof and having its two ends respectively protruding into the two said apertures, a pair of longitudinal members of magnetic material positioned on the other side of, and facing towards, said sheet-like member, the arrangement being such that relative movement can take place between the pair of longitudinal members on the one hand and the sheet-like member and the U-shaped member on the other hand, said relative movement taking place between a first position in which the longitudinal members are respectively positioned facing the said apertures whereby a first magnetic path of low magnetic reluctance exists between the longitudinal members along the U-shaped member, and a second position in which neither longitudinal member is positioned facing a said aperture whereby a second magnetic path of low magnetic reluctance exists between the longitudinal members along the sheet-like member, means for passing a magnetic flux along each said longitudinal member whereby substantially all the said flux passes along the first magnetic path when the members are in the said first position and substantially all the said flux passes along the second magnetic path when the members are in the said second position, and output means responsive to the change of flux in at least one said magnetic path for indicating said relative movement of the members.

According to a further aspect of the invention, there is provided a transducer, comprising a sheet-like member of magnetic material having a pair of spaced apertures therethrough, a pair of U-shaped members of magnetic material fixed relative to said sheet-like member and on one side thereof, each U-shaped member having one of its ends protruding into a respective one of the said apertures and the other of its ends substantially in contact with said sheet-like member, a pair of longitudinal members of magnetic material postioned on the other side of, and facing towards, sheet-like member, the arrangement being such that relative movement can take place between the pair of longitudinal members on the one hand and the sheet-like member and the U-shaped members on the other hand, said relative movement taking place between a first position in which one longitudinal member is positioned facing one said aperture and the other longitudinal member is positioned not facing either said aperture whereby to provide a first magnetic path of low magnetic reluctance between the longitudinal members along the U-shaped member whose said one end protrudes into the said one aperture and along part of the sheet-like member, a second position in which the said other longitudinal member is positioned facing the other said aperture and the said one longitudinal member is positioned not facing either said aperture whereby to provide a second magnetic path of low magnetic reluctance between the longitudinal members along the said U-shaped member whose said one end protrudes into the said other aperture and along part of the sheet-like member, and a third position in which neither longitudinal member is positioned facing said apertures whereby to provide a third magnetic path of low magnetic reluctance between the longitudinal members along the sheet-like member, means for passing a magnetic flux through each said longitudinal member whereby substantially all of the flux passes along the said first magnetic path when the members are in the said first position, substantially all of the flux passes along the said second magnetic path when the members are in the said second position and substantially all of the flux passes along the said third magnetic path when the members are in the said third position, and output means responsive to the change of flux in at least one said magnetic path for indicating said relative movement of the said members.

According to yet another aspect of the invention, there is provided a gyroscope assembly, comprising a body of nonmagnetic material forming the gimbal of the assembly and supporting the rotor of the assembly, a magnetic member positioned on the periphery of the rotor and having one end substantially in contact with a continuous surface of magnetic material on the rotor and having the other end facing radially outwards from the rotor, a sheet-like member of magnetic material positioned on the said body of nonmagnetic material and having an aperture therein, a U-shaped member of magnetic material having one end substantially in contact with the sheet-like member and the other end protruding into the said aperture towards the said rotor, the aperture being positioned in alignment with the locus of the magnetic member whereby the magnetic member moves, as the rotor rotates, between a first position in which the said other end of the magnetic member is facing the said aperture in the sheet-like member to provide a first magnetic path of low magnetic reluctance between the two ends of the magnetic member through the U-shaped member and the said continuous surface of magnetic material on the rotor, and a second position in which the said other end of the magnetic member is not positioned facing the said aperture in the sheet-like member whereby the first magnetic path of low magnetic reluctance is open-circuited and a second magnetic path of low magnetic reluctance is provided between the two ends of the magnetic member through the sheet-like member and the said continuous surface of magnetic material on the rotor, at least one coil wound on the U-shaped member, and output means for detecting the E.M.F. pulse generated in the coil due to the change of flux in the said first magnetic path, as the rotor rotates, whereby to indicate the instantaneous position of the rotor.

Transducers according to the invention, and a gyroscope assembly embodying the invention, will now be described, by way of example, and with reference to the accompanying drawings, in which:

FIGS. 7a, 7b and 7c show diagrammatically a rotor member in different positions and the output produced for these different positions by a transducer according to the invention;

FIGS. 8a and 8b show diagrammatically a rotor member with a transducer according to the invention which is modified to produce different outputs according to the direction of rotation of the rotor member;

FIG. 9 shows diagrammatically a transducer, according to the invention, of the type illustrated diagrammatically in FIG. 4, the transducer being associated with a rotor member.

Figure 1A:
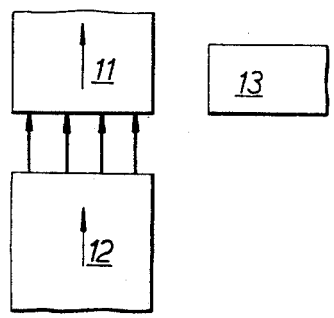
FIGS. 1a and 1b show diagrammatically the principle of operation of one transducer according to the invention.
Figure 1B:
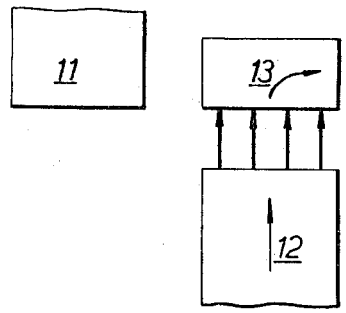

FIG. 1a shows a first element of magnetic material 11 arranged end to end with a second element of magnetic material 12, a magnetic flux being caused to flow through the elements 12 and 11 in the direction of the arrows by means not shown. Arranged adjacent the element 11, and fixed relative thereto, is a third element of magnetic material 13 to which only a very small proportion of the magnetic flux from the element 12 flows when the elements are in the positions shown in FIG. 1a. Referring now to FIG. 1b, it will be seen that the second element 12 has been moved to be adjacent the third element 13 and the majority of the magnetic flux now flows between elements 12 and 13. It will be appreciated that, with the elements in the positions shown in FIG. 1b, the majority of the available magnetic flux in element 12 would still flow into element 11, if the third element 13 was not present. Hence by providing a magnetic shunt path, that is, the element 13, a very good on-to-off ratio of signal can be provided for a transducer or pick-off which is arranged to determine the relative positions of two members by which the elements 11 and 12 are carried respectively.

Figure 2A:
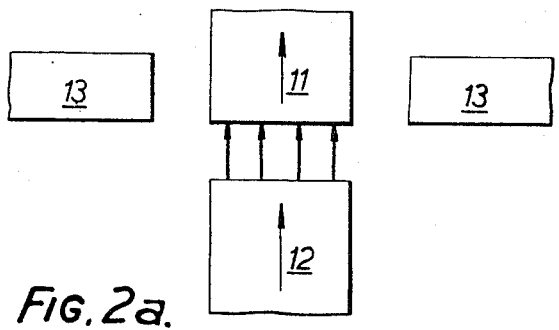
FIGS. 2a and 2b show diagrammatically the principle of operation of another transducer according to the invention.
Figure 2B:
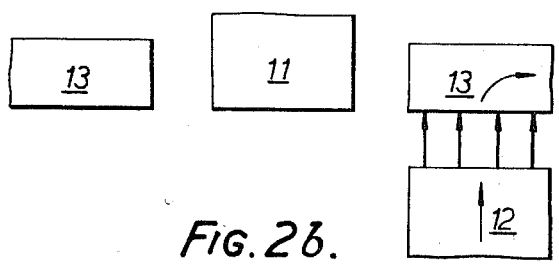

FIGS. 2a and 2b show an arrangement similar to that of FIGS. 1a and 1b except that the third element 13 extends from adjacent two opposite sides of the element 11. Therefore, a shunt path is provided by the third element 13 when the second element 12 is moved to the left, as well as when it is moved to the right, of the first element 11. It should be appreciated that in all the FIGS. 1a, 1b, 2a and 2b the elements 11 and 12 form a portion of a complete magnetic circuit and the elements 12 and 13 form a portion of a complete alternative magnetic circuit.

Figure 3:
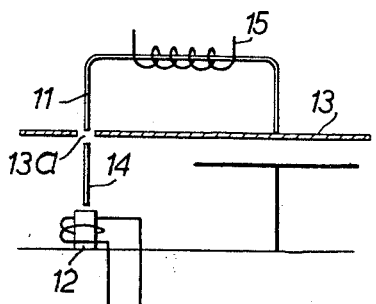
FIG. 3 shows diagrammatically the magnetic circuit of one transducer according to the invention.

FIG. 3 shows the complete magnetic circuit of a magnetic pick-off or transducer. In this arrangement, the element 12 comprises an electromagnet and there is interposed between the magnet 12 and the element 11 a fourth element of magnetic material material 14 which serves to direct magnetic flux from the magnet 12 to the element 11. The third element 13 is in the form of a sheet-like member formed with an aperture 13a into which the element 11 protrudes. The element 11 is U-shaped and is connected only at its end remote from the aperture 13a to the third element 13 and acts as the core of an electrical coil 15. The electromagnet 12 is energised from an A.C. source: therefore, with the elements positioned as shown in FIG. 3, an output pulse is induced in the coil 15 by the alternating flux in the magnetic circuit including the element 11 and can be detected by suitable means. If the electromagnet 12 and or the fourth element 14 are moved from the positions shown in FIG. 3, the return path for the magnetic flux is through the third element 13 rather than through the first element 11 and therefore substantially no output is produced from the coil 15.

Figure 4:
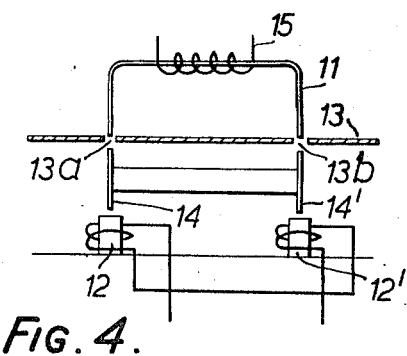
FIG. 4 shows the magnetic circuit of another transducer according to the invention.

FIG. 4 shows a transducer similar to that of FIG. 3 except that the end of the first element 11 which is remote from aperture 13 is, instead of being connected to the element as in FIG. 3, positioned in an aperture 13b therein so as to cooperate with a further element 14' which in turn cooperates with a further electromagnet 12'. This transducer has the same operation as that for FIG. 3, the coils of electromagnets 12 and 12' being arranged to aid each other with regard to the flow of magnetic flux around the magnetic circuit and hence increase the strength of the output signal induced in the coil 15.

Figure 5:
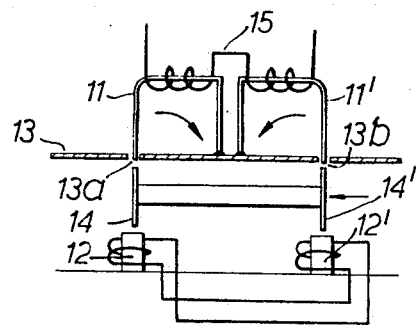
FIG. 5 shows the magnetic circuit of a further transducer according to the invention.

FIG. 5 shows a transducer similar to that of FIG. 4 except that a further first element 11' is provided which is positioned in the aperture 13b. The coil 15 embraces both first elements 11 and 11' and when element 14 is in alignment with element 11, element 14' is out of alignment with element 11' and vice versa.

Figure 6A:
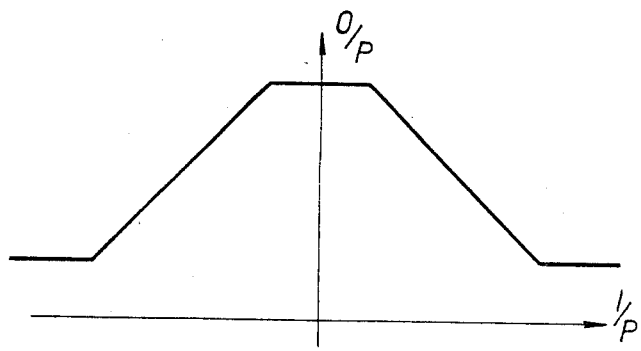
FIGS. 6a, 6b and 6c show various forms of outputs which can be produced from the transducers shown in FIGS. 3, 4 and 5.
Figure 6B:
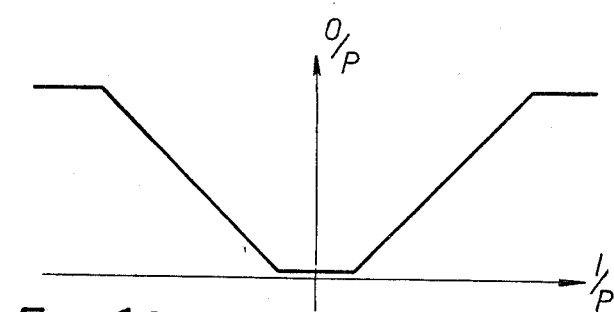
Figure 6C:
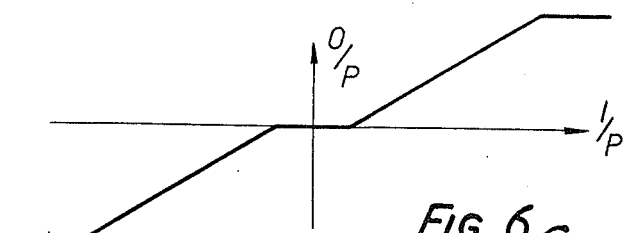

FIG. 6a shows the form of output which is produced by the transducers shown in FIGS. 3 and 4, FIG. 6b shows the output produced from the transducer of FIG. 5 when the magnets 12 and 12' are energised to assist each other, and FIG. 6c shows the output produced from the transducer of FIG. 5 when the magnets 12 and 12' are energised to oppose one another.

FIG. 7a shows a transducer arrangement similar to that of FIG. 3 being utilised to monitor the rotation of a rotor 16 about an axis 16a. The element 12 is in the form of a permanent magnet and is embedded in the periphery of the rotor 16 so as to be in alignment with the element 14 when the rotor 16 is in a vertical position. Each time the magnet 12 passes the element 14, a pulse 17 of E.M.F., having a relatively large positive amplitude, is produced in the coil 15. The same arrangement is shown in FIGS. 7b and 7c but in these cases the axis 16a of the rotor 16 is not exactly horizontal and hence the output pulse 17 produced in the coil 15 is of relatively low amplitude. Therefore, the output pulses 17 can be utilised to indicate whether the rotor 16 is rotating in its correct position (with its axis 16a horizontal) by virtue of the amplitude of the pulses induced in the coils 15; furthermore, the speed of rotation can be determined by the repetition frequency of the pulses 17.

FIG. 8a shows a side elevational view of a modified form of the arrangement of FIG. 7a. It will be seen that the element 14 is asymmetrical in that it has an extension 14a so that, during rotation of the rotor in the direction of the arrow, the rising rate of change of flux linkage as the magnet 12 approaches the element 14 is greater than the falling rate of change of flux linkage as the magnet 12 moves away from the element 14. Hence the positive amplitude of the output pulse from coil 15 is greater than the negative amplitude. FIG. 8b shows the same arrangement as FIG. 8a but with the rotor 16 rotating in the opposite direction. It will be seen that in this case the rising rate of change of flux linkage as the magnet 12 approaches element 14 is smaller, due to the extension 14a, than the falling rate of change of flux linkage as the magnet 12 moves away from the element 14. Hence the output pulse 17 from the coil 15 has a relatively low positive amplitude and a relatively high negative amplitude. Thus it will be seen that by detecting which of the negative or positive amplitudes is the greater or by detecting when either amplitude exceeds a predetermined value the direction of rotation of the rotor 16 can be determined.

FIG. 9 shows diagrammatically the transducer of FIG. 4 as applied for monitoring the rotation of a rotor member 16, the electromagnets 12 and 12' being replaced by permanent magnets 12a and 12b embedded in the periphery of the rotor member 16.

Figure 10:
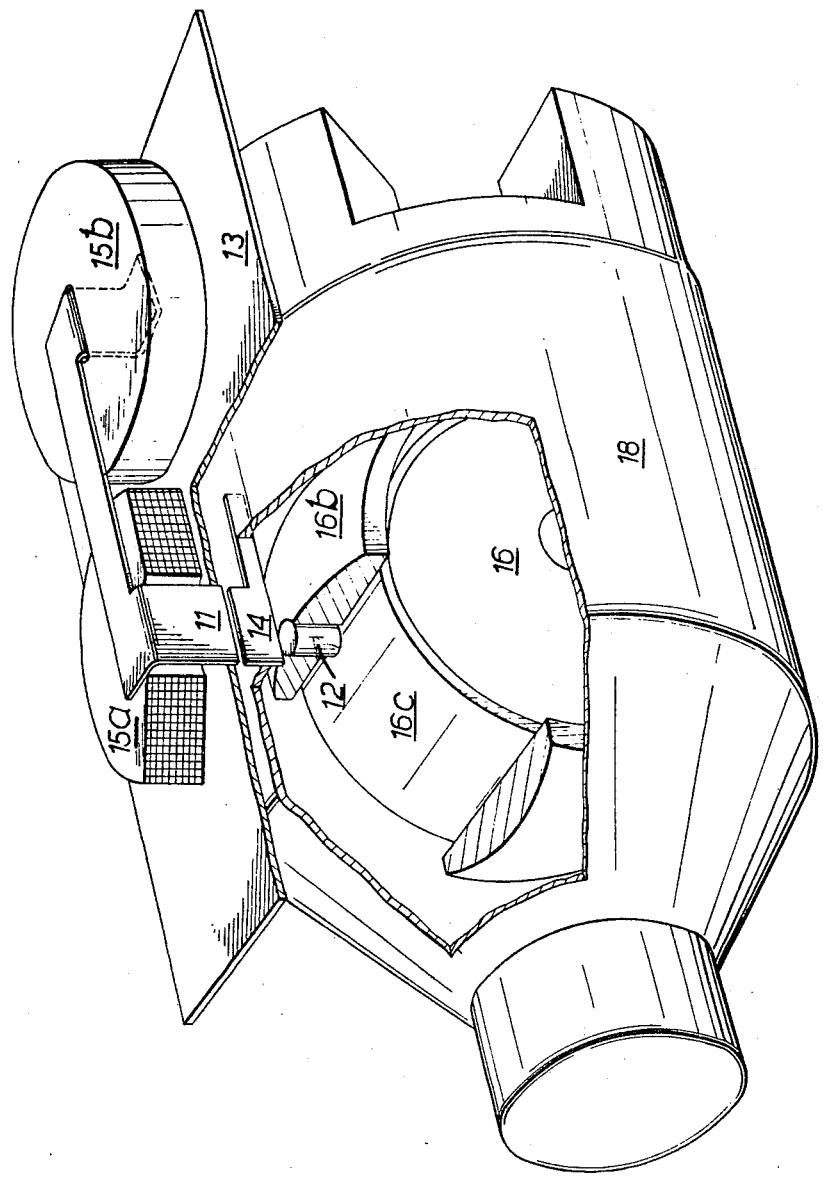
FIG. 10 shows a perspective view, part cut away, of a rate gyroscope, and associated transducer, embodying the invention for monitoring the rotor of the gyroscope.

FIG. 10 shows a perspective view, part cut away, of a gyroscope whose rotor is monitored by a transducer similar to that shown in FIGS. 7 and 8. The rotor 16 has an outer periphery 16b formed of nonmagnetic material into which the magnet 12 is embedded, and has a ring 16c of hysteresis material immediately adjacent the outer periphery 16b. The whole rotor 16 is enclosed within a body member 18 of nonmagnetic material, forming the gimbal of the gyroscope, into which the element 14 is embedded so as to cooperate with the magnet 12. The element 13 is in the form of a sheet with the element 11 fixed at one of its ends thereto. The coil 15 is in the form of two separate coils 15a and 15b and the element 11 passes through them in opposite directions. The coils 15a and 15b are connected such that their respective signal outputs are added whilst noise signals generated in these coils, due to the magnetic field of the electric motor (not shown) driving the rotor, are cancelled.

The transducers described herein may be utilised in conjunction with the monitored rate gyroscope system disclosed in copending United States application Ser. No. 444,324, now Pat. No. 3,377,872, assigned to the assignee of this application in place of the pick-off arrangement disclosed therein.

The transducers shown in the embodiments of FIGS. 3, 7a, 7b, 7c, 8a, 8b, 9 and 10 have particular advantage for use in detecting failure of rate gyroscopes, because correct operation is indicated by a maximum amplitude of signal so ensuring that open-circuit, short circuit and similar faults are more easily detected.

What is claimed is:

1. In a gyroscope assembly comprising a base and a gyroscope rotor rotatably supported on the said base, a transducer comprising:
   first, second, and third elements of magnetic material,
   magnetic flux generating means for passing magnetic flux through the said second element,
   means mounting the first and third elements on either the base or the rotor adjacent to one another and in fixed relationship to each other, and means mounting the second element on the other of the base or the rotor, whereby the first and third elements on the one hand and the second element on the other hand are arranged for relative movement between a first position providing a first path between the first and second elements for said magnetic flux, and a second position providing a second path between the second and third elements for said magnetic flux, substantially all the said magnetic flux passing along the first path when the said elements are in the said first position and substantially all the said magnetic flux passing along the said second path when the said elements are in the said second position,
   output means responsive to the change of said magnetic flux in at least one said path for indicating said relative movement of the elements, and
   a fourth element of magnetic material fixedly mounted relative to said first and second elements and positioned so as to lie between the first and second said elements when the elements are in the said first position, the said fourth element then extending from the center of the first path for a greater distance in one direction of said relative movement of the elements than in the opposite direction whereby the response of said output means to the said relative movement of the elements is dependent on the direction of said relative movement.

2. A gyroscope assembly according to claim 1, in which said third element comprises a sheet-like member of magnetic material defining an aperture therethrough, said first element comprises a longitudinal member of magnetic material mounted on the said base in fixed relationship to the said sheet-like member and having an end closely adjacent the said aperture, and said second element comprises a longitudinal member of magnetic material mounted on the said rotor so that its longitudinal axis extends towards the said end of the longitudinal member adjacent the said aperture when the said elements are in the said first position and extends towards the sheet-like member when the said elements are in the said second position.

3. A gyroscope assembly according to claim 1 in which:
   said third element comprises a sheet-like member of magnetic material defining at least one aperture therethrough,
   said first element comprises a U-shaped member of magnetic material fixed to said sheet-like member on one side thereof and having one of its ends closely adjacent to the said aperture,
   said second element comprises a longitudinal member of magnetic material positioned on the other side of, and facing towards, said sheet-like member whereby to be aligned with said aperture when the elements are in the said first position, and
   the said output means comprises a coil wound on said U-shaped member and means responsive to an E.M.F. generated across the coil by the said change of flux.

4. A gyroscope assembly according to claim 1, in which said second element is permanently magnetized to constitute the said magnetic flux generating means.

5. A rate gyroscope assembly comprising a body of nonmagnetic material,
   a gyroscope rotor rotatably supported in the said body and substantially surrounded thereby,
   a substantially continuous surface of magnetic material mounted on the periphery of the rotor,
   a longitudinal magnetic member mounted on the periphery of the rotor having one end substantially in contact with the said continuous surface of magnetic material and the other end facing substantially radially outwards from the rotor,
   a sheet-like member of magnetic material defining an aperture therethrough and mounted on the said body of nonmagnetic material,
   a U-shaped member of magnetic material having one end substantially in contact with the said sheet-like member and the other end protruding into the said aperture towards the said rotor,
   a magnetic flux generating means for passing a magnetic flux through said magnetic member,
   the said aperture being positioned in alignment with the locus of the magnetic member whereby the magnetic member is carried by the rotor between a first position in which the said other end of the magnetic member is facing the said aperture in the sheet-like member to provide a first path between the two ends of the magnetic member for magnetic flux, the said first path extending through the U-shaped member and said continuous surface of magnetic material on said rotor, and a second position in which the said other end of the magnetic member has moved away from the said aperture in the sheet-like member whereby the said first path for magnetic flux is open-circuited and a second path of magnetic flux is provided between the two ends of the magnetic member, the said second path extending through the sheet-like member and the said continuous surface of magnetic material on the rotor, coil means wound on the U-shaped member, output means for detecting an E.M.F. pulse generated in the said coil means due to the change of flux in the said first path as the rotor rotates whereby to indicate the instantaneous position of the said rotor, and an intermediate member of magnetic material mounted between the said aperture in the sheet-like member and the locus of said magnetic member, the said intermediate member extending for a greater distance from the centre of the aperture in one direction of rotation of the rotor than in the opposite direction, whereby the shape of the said E.M.F. pulse generated in the said coil means differs according to the direction of rotation of the said rotor.

6. A gyroscope assembly according to claim 5, in which the said coil means comprises:

two coils wound on the said U-shaped member and physically aligned with each other so that any E.M.F. pulses respectively generated in them by an external field tend to cancel each other, and means connecting the two said coils in series.

References Cited

UNITED STATES PATENTS 3,176,241    3/1965    Hogan et al. _ _ _ _ _ _ 324—34 XR

FRED C. MATTERN, Jr., Primary Examiner

M. A. ANTONAKAS, Assistant Examiner